July 17, 1923.
L. J. McKONE
TIRE CHANGING JACK
Filed Sept. 8, 1921
1,462,040
3 Sheets-Sheet 3
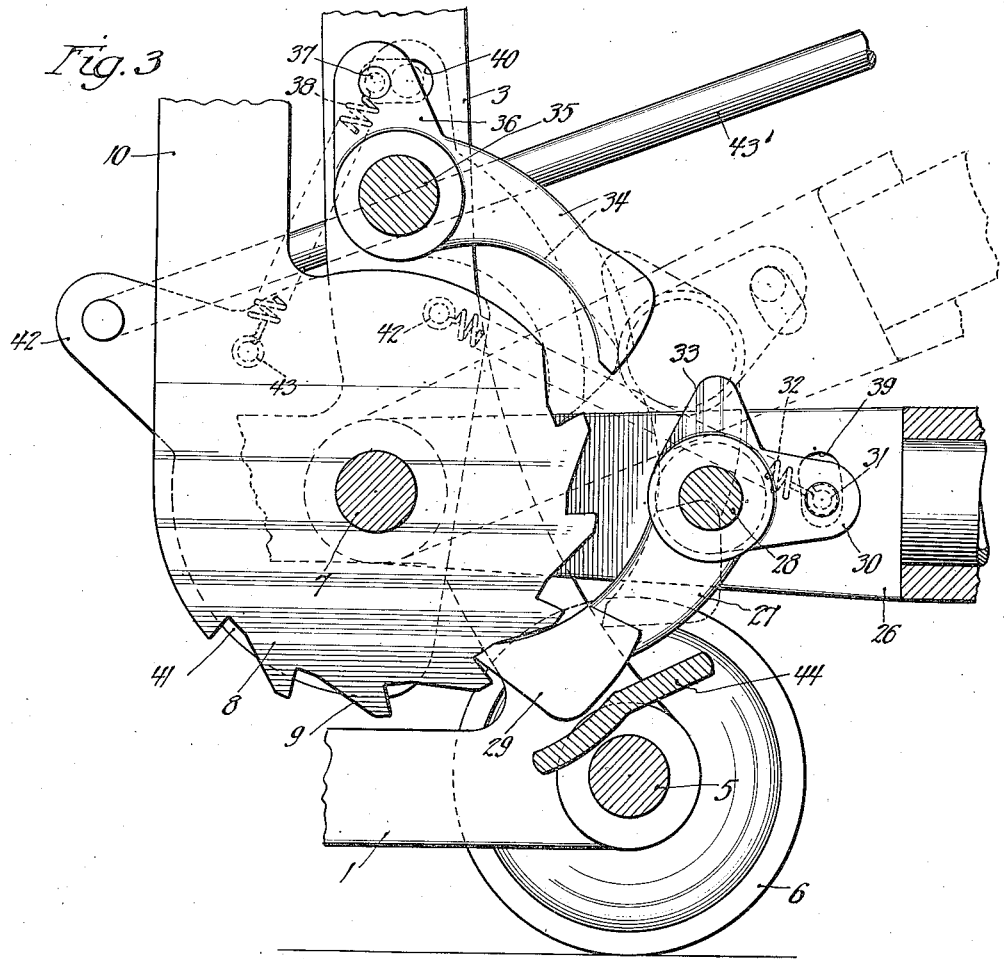
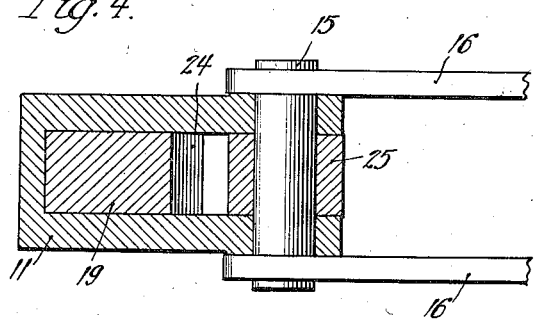
Witness.
Victor Siljander.
Ruth M. Ephraim
Inventor.
Leo J. McKone
By: Hill & Hill
Attys.

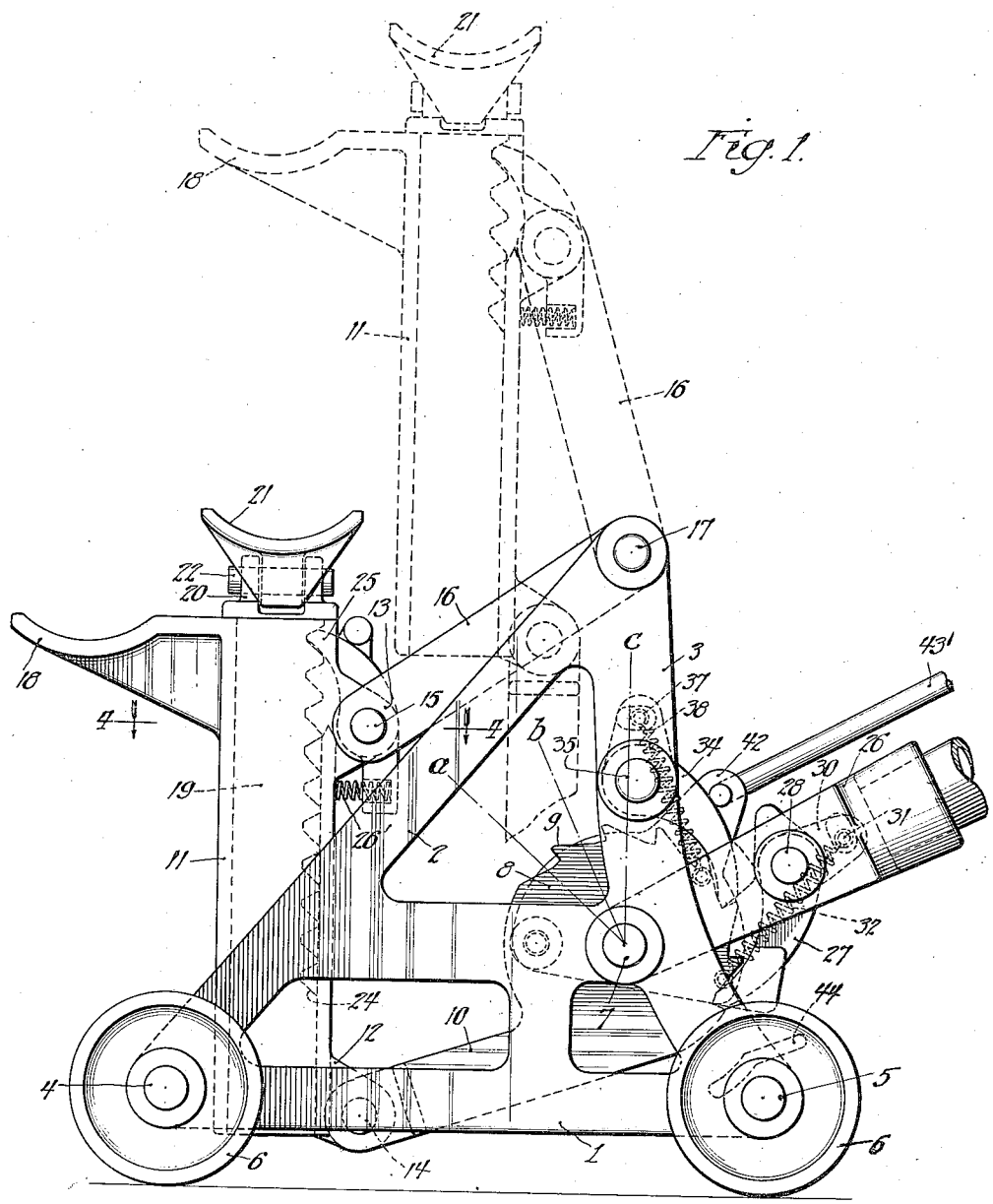

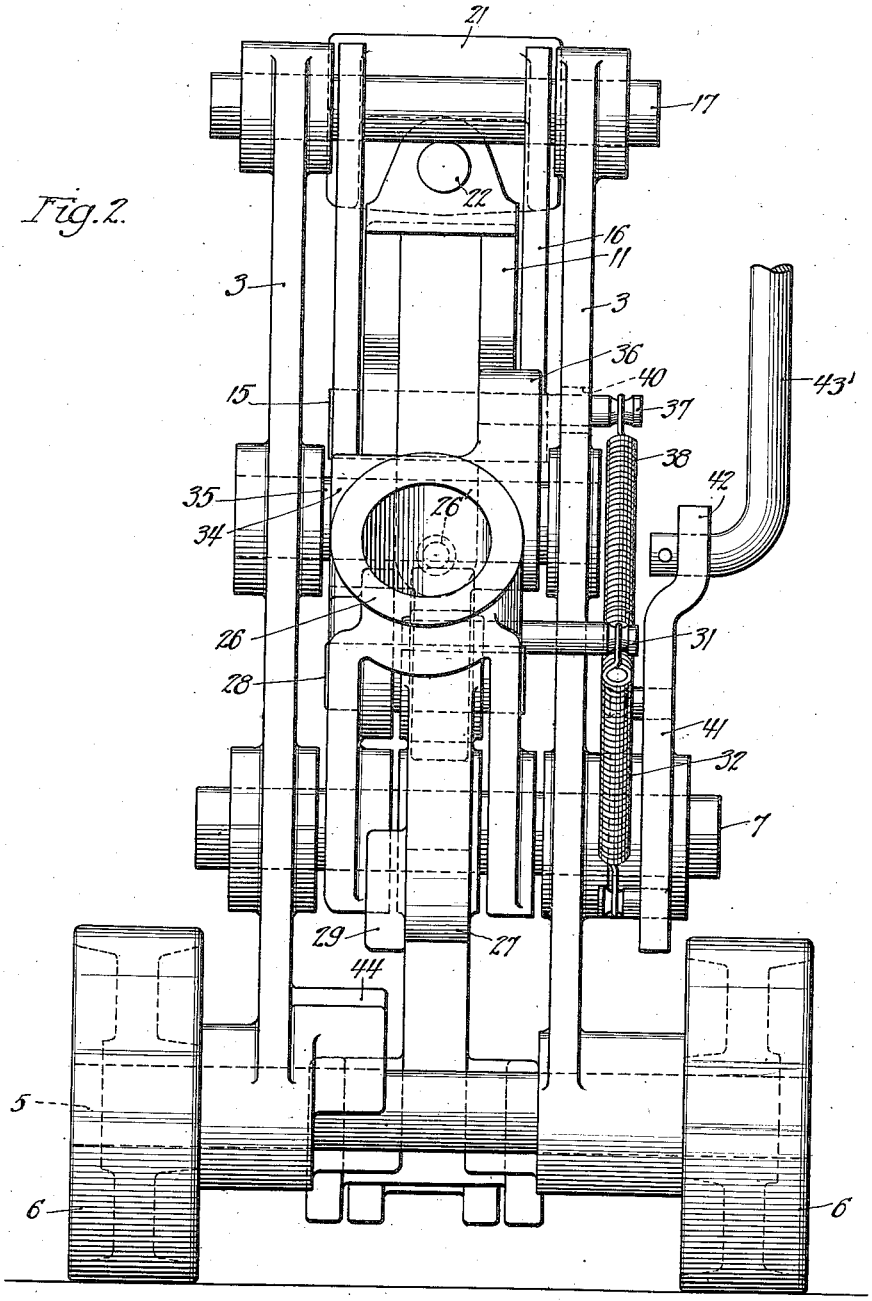

Patented July 17, 1923.

1,462,040

UNITED STATES PATENT OFFICE.

LEO J. McKONE, OF CHICAGO, ILLINOIS, ASSIGNOR TO MID-WEST MFG. CO., OF MINNEAPOLIS, MINNESOTA, A CORPORATION OF SOUTH DAKOTA.

TIRE-CHANGING JACK.

Application filed September 8, 1921. Serial No. 499,154.

*To all whom it may concern:*

Be it known that I, LEO J. McKONE, a citizen of the United States, residing at Chicago, in the county of Cook and State of Illinois, have invented certain new and useful Improvements in Tire-Changing Jacks, of which the following is a description.

My invention relates to improvements in a tire changing jack, and has for its objects the production of a jack whereby vehicles may be lifted with little effort and which will safely and securely hold said vehicle at any desired elevation.

Another object of my invention is to provide a portable tire changing jack which may be quickly released from the load and which is simple, convenient, compact, durable, reliable, efficient and satisfactory for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a side elevation of my device;

Fig. 2 is a plan view thereof as seen from above;

Fig. 3 is a detail of the operating mechanism; and

Fig. 4 is a section taken substantially on the line 4—4 of Fig. 1.

In the drawings, wherein I have illustrated the preferred embodiment of my invention, there is shown a pair of triangular side frames, each comprising a base 1 and legs 2 and 3, said side frames being connected at their lower ends by axles 4 and 5, to which are journaled rollers or wheels 6.

Mounted between the side frames above the base members 1 is a shaft 7, and upon said shaft is journaled a ratchet wheel 8, having ratchet teeth 9 over a portion of the circumference thereof, and having an arm 10 extending preferably tangentially thereof. In the present instant the arm 10 is integral with the ratchet wheel 8, but it is to be understood that it may be made separate therefrom and secured thereto in any suitable or preferred manner, if so desired. A casing or sleeve 11 is pivotally carried between the side frames, said casing having lugs or ears 12 and 13 at the lower and upper ends thereof, said ears being apertured to receive pivot pins 14 and 15 therethrough, the free end of the arm 10 being pivotally journaled on the pin 14. Links 16 having one of their ends pivoted to the pin 15, and their other ends pivoted to the top of the frame by means of a shaft or pin 17, connect said sleeve and frame. Integral with the casing 11 and offset laterally therefrom at its upper end is a finger 18, preferably concave in its upper surface and of a narrow vertical dimension so that it may be inserted between an axle and truss rod. Vertically slidable in the sleeve 11 is a stem 19, having a pair of spaced ears 20 at its upper end. A load-engaging member 21, preferably curved or concave in its upper surface, is pivotally secured between the ears 20 by means of a pin 22, or other suitable or equivalent means, so that the member 21 will accommodate itself to bent axles or tapered axles, as well as to straight axles.

Rack teeth 24 are formed along one side of the stem 19, said rack teeth being engageable with a pawl 25, which is pivoted to the pin 15 and having a spring 26' cooperating therewith for yieldably holding said pawl in engagement with said teeth. The purpose of the pawl 25 is to provide initial adjustment of the head, that is, the stem 19 is initially lifted or raised until it is approximately of the height of the axle with which it is to be engaged, the teeth of the pawl and rack being so formed that there will be no tendency for the pawl to disengage when the load is being supported.

An operating handle 26 is mounted on the shaft 7, said handle having a lifting pawl 27 pivotally secured thereto by means of a pin 28, said pawl having an offset projection 29 for a purpose to be hereinafter described. Integral with the pawl 27 is an arm 30, having a pin 31, projecting laterally therefrom to receive one end of a spring 32, the arm 30 forming a bell-crank lever with the pawl. A cam portion 33 is also formed at the base of the pawl 27, for a purpose to be hereinafter described.

Pivoted between the legs 3 of the frame is a holding pawl 34, said holding pawl being mounted on a pin 35, and having an arm 36 forming substantially a bell-crank lever with said pawl, similar to the arm 30 of the pawl 27. Projecting laterally of the arm 36 is a pin 37, to which is secured one end of a spring 38. An elongated slot 39 is formed in the handle 26, and a similar slot 40 is formed in the leg portion 3 of one of the frame members, said slots being adapted to slidably receive said pins 31 and 37 respectively. A plate or disc 41 is mounted on the shaft 7, preferably exteriorly of the frame members 3, said disc having a pair of circumferentially spaced pins 42 and 43 thereon, forming anchors for the ends of the springs 32 and 38 respectively.

The plate 41 has a radially offset ear or lug 42, adapted to receive one end of an operating rod 43', so that when the rod 43' is shifted in the direction shown by the arrows in Figs. 1 and 3, the disc 41 will be partially rotated or shifted to swing said pins 42 and 43 to the position shown in Fig. 3, whereby the springs through their pull on the portions 30 and 36 of the pawls will tend to force said pawls out of engagement with the ratchet teeth and shift the pins 31 and 37 in the slots 39 and 40 respectively, so that the pull will not be in line with the journal axes of the pawls.

A guide 44 is formed on the lower end of the leg portion 3 of one of the side frames adjacent the offset portion 29 of the pawl 27, said guide 44 serving to wedge or guide the tooth of the pawl 27 into the base of the ratchet teeth recesses when the pawl is moved downwardly, the cam portion 29 of the pawl 27 engaging the surface of the guide 44 during its wedging action.

The load to be lifted and supported is preferably raised in a series of intermittent strokes of the handle, each stroke of the handle operating the pawl and ratchet to move the ratchet forward one tooth, or from the point "a" to the point "b", and from the point "b" to the point "c", etc., successively, as shown in Fig. 1, the holding pawl 34 being yieldably held against the ratchet by the spring 38 and preventing the ratchet from releasing the load and returning to its initial position.

As shown in Fig. 1, the pull of the spring is normally inwardly during the lifting operation, so that the holding pawl 34 will hold the load against lowering when the lifting pawl 27 is released and raised upwardly to re-engage a succeeding tooth, this releasing of the lifting pawl 27 being against the pull of the spring 32. When it is desired to release the load, the lever 43' is shifted in the direction shown by the arrow (see Figs. 1 and 3), whereupon the springs 32 and 38, instead of yieldably holding the pawls in engagement with the ratchet, will exert an outward pull, tending to release said pawls from engagement with said ratchet, as shown in full lines in Fig. 3, but as the load thrust is transmitted directly against the lifting pawl in the position shown, the pawl will not disengage until the operating handle is raised.

When the operating handle 26 is moved upwardly, assuming that the pawl 34 is in the position shown in full lines in Fig. 3, then as soon as the pawl 27 is moved upwardly, the spring 32 will be free to act and to pull it outwardly, bringing the cam portion 33 against the pawl 34, and permitting the ratchet wheel to rotate through the distance of one tooth and then causing said pawl 34 to hold the ratchet wheel against release. As soon as the pawl 34 is engaged, the load will overcome the spring pull and hold it in engagement. This action will continue until the load is entirely lowered tooth by tooth, whereupon the lever 43' is shifted to the normal position shown in Fig. 1, causing the springs 32 and 38 to pull said pawls 27 and 34 into engagement with the teeth of the ratchet wheel.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a jack of the kind described and in combination, a supporting frame, a load-lifting head carried thereby, a ratchet wheel controlling said head, a lifting pawl engageable with said ratchet wheel, means for operating said pawl intermittently to partially rotate said ratchet wheel to move said head, a holding pawl engageable with said ratchet wheel, means for yieldably releasing said holding pawl while said lifting pawl is in operative engagement with said ratchet wheel, and means operable by said lifting pawl for automatically moving said released holding pawl into locking engagement with said ratchet wheel when said lifting pawl is released.

2. In a jack of the kind described and in combination, a supporting frame, a load-lifting head carried thereby, a ratchet wheel controlling said head, a lifting pawl and a holding pawl circumferentially spaced and engageable with said ratchet wheel, said pawls having bell-crank arms, springs connected to said bell-crank arms for normally maintaining said pawls in toothed engagement with said ratchet wheel, means for shifting said springs in unison so that they will exert an outward pull on said pawls to release them from engagement with said ratchet wheel, operating means for moving said lifting pawl and said holding pawl, whereby said lifting pawl when released and operatively moved past said released holding pawl will be pulled inwardly by said spring into engagement with said released holding pawl to press it into holding engagement with said ratchet teeth.

3. In a jack of the kind described and in combination, a supporting frame, a load-lifting head carried thereby, a ratchet wheel controlling the movement of said head, a lifting pawl and a holding pawl circumferentially spaced about said ratchet wheel and engageable therewith, said pawls having bell-crank arms, springs connected to said bell-crank arms for normally maintaining said pawls in toothed engagement with said ratchet wheel, manually operable means for shifting said springs in unison so that they will exert an outward pull on said pawls to tend to release them from engagement with said ratchet wheel, an operating handle pivotally connected to said lifting pawl for moving said pawl with said ratchet wheel, said lifting pawl being movable past said holding pawl, whereby said lifting pawl when released and moved past said released holding pawl by said handle will be automatically pulled by said spring into engagement with said holding pawl to press it into holding engagement with said ratchet teeth.

4. In a jack of the kind described and in combination, a supporting frame, a lifting head, a ratchet wheel pivotally mounted in said frame and controlling said head, a lifting pawl and a holding pawl slidably engageable with one another and both engageable with said ratchet teeth, means for yieldably holding said pawls in engagement with said ratchet teeth, and manually operable means for shifting said holding means for successively pulling said pawls out of engagement with said ratchet teeth.

5. In a jack of the kind described and in combination, a supporting frame, a lifting head movable therein, a ratchet wheel pivotally mounted in said frame and controlling said head, a lifting pawl and a holding pawl slidable on one another and engageable with the teeth of said ratchet wheel, means for yieldably moving said pawls inwardly toward said ratchet teeth, means for shifting said last mentioned means to pull said pawls away from said ratchet to successively release them, whereby the releasing of said lifting pawl will permit said pulling means to act thereon to engage the forward end of said holding pawl to press it into re-engagement with said ratchet wheel, the interval between the releasing of the lifting pawl and said re-engagement of the holding pawl permitting the movement of said ratchet wheel through the distance of one tooth.

6. In a device of the kind described and in combination, a supporting frame, a load-lifting head carried thereby, a ratchet wheel connected to and controlling said lifting head, a lifting pawl engageable with said ratchet wheel, a handle pivoted to said lifting pawl and controlling the operation thereof, a holding pawl contactingly engageable with said ratchet wheel, means for normally maintaining an inward pull on said pawls to keep them in engagement with said ratchet wheel, manually operable means for reversing the pull on said pawls, and means for releasing said ratchet wheel tooth by tooth by successive strokes of said operating handle when said pawls are pulled outwardly of said ratchet teeth.

7. In a device of the kind described and in combination, a supporting frame, a load-lifting head carried thereby, a ratchet wheel connected to and controlling said lifting head, a lifting pawl contactingly engageable with said ratchet wheel, a handle pivoted to said lifting pawl and controlling the operation thereof, a holding pawl engageable with said ratchet wheel, means for normally maintaining an inward pull on said pawls to keep them in engagement with said ratchet wheel, manually operable means for reversing the pull on said pawls, and means for successively releasing and engaging said outwardly pulled pawls with said ratchet wheel to lower said lifting head in intermittent steps through successive distances of one ratchet tooth.

8. In a jack of the kind described and in combination, a supporting frame, a load-lifting head vertically movable therein, a ratchet wheel carried by said frame and having an arm pivotally connected to said lifting head, an operating handle, a lifting pawl pivotally connected to said handle and engageable with said ratchet wheel, a holding pawl pivoted to said frame and engageable with said ratchet teeth, said pawls having bell-crank lever arms, springs connected to said pawls, both of said springs being normally on one side of said pivotal axis of the pawls, means for shifting said springs to the other side of said pivotal axes to exert an outward pull on the toothed ends of said pawls, and means for releasing said ratchet wheel tooth by tooth by successive strokes of the operating handle when said springs are shifted so that they pull the pawls outwardly of their toothed engagement with the ratchet wheel.

9. In a jack of the kind described and in combination, a supporting frame, a load-lifting head, a ratchet wheel connected to and controlling said head, an operating handle, a pawl pivoted to said handle and engageable with said ratchet wheel, and stationary guide means on said frame engageable with said pawl for guiding it into the bottom of the ratchet teeth.

10. In a jack of the kind described and in combination, a supporting frame, a load-lifting head carried thereby, a ratchet wheel controlling said head, a lifting pawl and a holding pawl engageable with said ratchet wheel, means for normally maintaining said pawls in toothed engagement with said ratchet wheel, means for shifting said last-mentioned means so that they will release said pawls from engagement with said ratchet wheel, operating means for moving said lifting pawl and said holding pawl whereby said lifting pawl when released and operatively moved past said released holding pawl will be moved into engagement with said released holding pawl to press it into holding engagement with said ratchet teeth.

In testimony whereof, I have hereunto signed my name in the presence of two subscribing witnesses.

LEO J. McKONE.

Witnesses:
B. V. ZILLMAN,
N. C. JACOBS.